(12) United States Patent
Wang

(10) Patent No.: US 7,466,182 B2
(45) Date of Patent: Dec. 16, 2008

(54) LEVEL SHIFT CIRCUIT

(75) Inventor: Tze-Chien Wang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 147 days.

(21) Appl. No.: 11/543,041

(22) Filed: Oct. 5, 2006

(65) Prior Publication Data
US 2007/0085590 A1    Apr. 19, 2007

(30) Foreign Application Priority Data
Oct. 17, 2005 (TW) ............................... 94136106 A

(51) Int. Cl.
*H03L 5/00* (2006.01)
(52) U.S. Cl. ..................................................... 327/333
(58) Field of Classification Search .................. 326/80, 326/81; 327/318, 319, 333
See application file for complete search history.

(56) References Cited

U.S. PATENT DOCUMENTS

| | | | |
|---|---|---|---|
| 5,057,721 A | 10/1991 | Miyazaki et al. | |
| 5,351,182 A | 9/1994 | Miyazaki et al. | |
| 6,002,290 A * | 12/1999 | Avery et al. | 327/333 |
| 6,362,679 B2 | 3/2002 | Wile | |
| 6,362,831 B1 | 3/2002 | Shyu | |
| 6,476,672 B2 | 11/2002 | Berkhout | |
| 6,501,321 B2 | 12/2002 | Kumagai | |
| 6,556,061 B1 * | 4/2003 | Chen et al. | 327/333 |
| 6,670,841 B2 * | 12/2003 | Kobayashi | 327/333 |
| 6,777,981 B2 * | 8/2004 | Kobayashi | 326/81 |
| 6,819,159 B1 * | 11/2004 | Lencioni | 327/333 |
| 6,906,552 B2 * | 6/2005 | Ajit | 326/81 |
| 6,930,518 B2 * | 8/2005 | Kim et al. | 327/112 |
| 6,933,755 B2 * | 8/2005 | Hong et al. | 327/108 |
| 7,151,400 B2 * | 12/2006 | Chen | 327/333 |
| 7,324,097 B2 * | 1/2008 | Koyama et al. | 345/204 |

* cited by examiner

*Primary Examiner*—Jeffrey S Zweizig
(74) *Attorney, Agent, or Firm*—Rosenberg, Klein & Lee

(57) ABSTRACT

In many high voltage circuits, it often needs to shift the logic voltage level to keep the circuit normal operation. In the class-D amplifier circuitry, it needs to shift the voltage level of pulse width modulation (PWM) signal to control the connecting of different power switches. In other applications, such as a driver to drive amplifier of an audio device, it also needs a level shift circuit to maintain the circuitry in normal voltage operation. Therefore, this invention is to provide a novel level shift circuit with high performance, low cost and low power dissipation characteristics.

18 Claims, 7 Drawing Sheets

LEVEL SHIFT CIRCUIT

BACKGROUND OF THE INVENTION

1. Field of the Invention

The present invention relates to a level shift circuit, and more particularly, to the level shift circuit that has a low power dissipation and is realized in a more simplified way.

2. Description of Related Art

As shown in FIG. 1, one integrated circuit (IC) could exist different supply voltages for different applications, a level shift circuit 100 is required between two circuitries with different supply voltages to adjust the level of logic signals so as to maintain the normal operation of the circuitry. FIG. 2 is a diagram showing the signal relation between an input signal S1 and an output signal S2 of the level shift circuit 100 in FIG. 1. As shown in FIG. 2, after the output signal S2 passes the level shift circuit 100, its logic value does not change, but its voltage level is different. The voltage level of $V_{H1}$ is shifted to the voltage level of $V_{H2}$, and the voltage level of $V_{L1}$ is shifted to the Voltage level of $V_{L2}$.

In U.S. Pat. Nos. 5,057,721, 5,351,182, 6,362,679, 6,362,831 and 6,501,321, a level shift circuit making use of current and resistance to generate levels is disclosed. The level shift circuit using this method to generate levels will consume a large amount of power and require a complicated circuit to ensure the reliability and performance.

Besides, U.S. Pat. No. 6,476,672 discloses a level shift circuit of low power dissipation, high reliability and high performance, but it needs to generate four complicated control signals to achieve the function of level shifting.

SUMMARY OF THE INVENTION

It is an object of the present invention to provide a level shift circuit of high performance, high reliability, low power dissipation, more simplified realization and low cost.

It is an object of the present invention to provide a level shift circuit for driving an audio device.

According to an exemplary embodiment of the claimed invention, a level shift circuit is disclosed. The level shift circuit comprises a first voltage level transfer unit, for transferring the voltage level of a first input signal from a first voltage level to a second voltage level and outputting a first level transferred control signal; a second voltage level transfer unit, for transferring the voltage level of a second input signal from the first voltage level to the second voltage level and outputting a second level transferred control signal; and a control block circuit coupled to the first voltage level transfer unit and the second voltage level transfer unit, for outputting an output signal according to the first level transferred control signal and the second level transferred control signal; wherein the first input signal and the second input signal are inversed.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
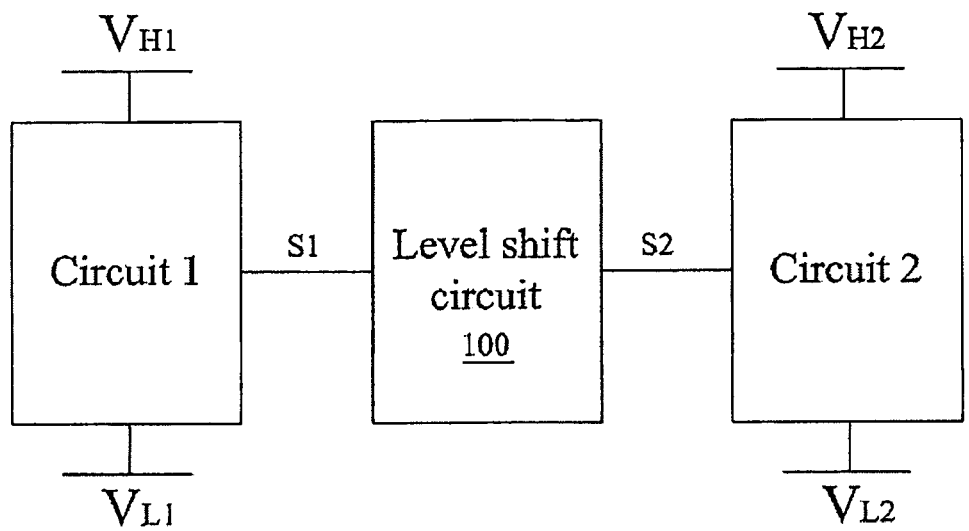
FIG. 1 is a diagram showing the function of a level shift circuit.
Figure 2:
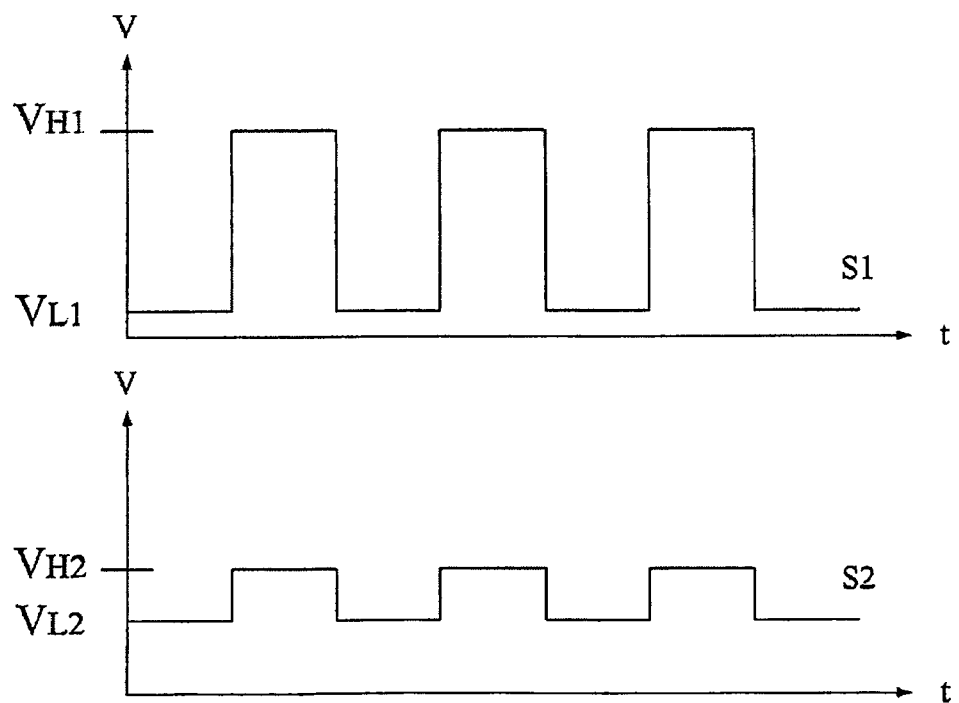
FIG. 2 is a clock diagram of a level shift circuit.
Figure 3:
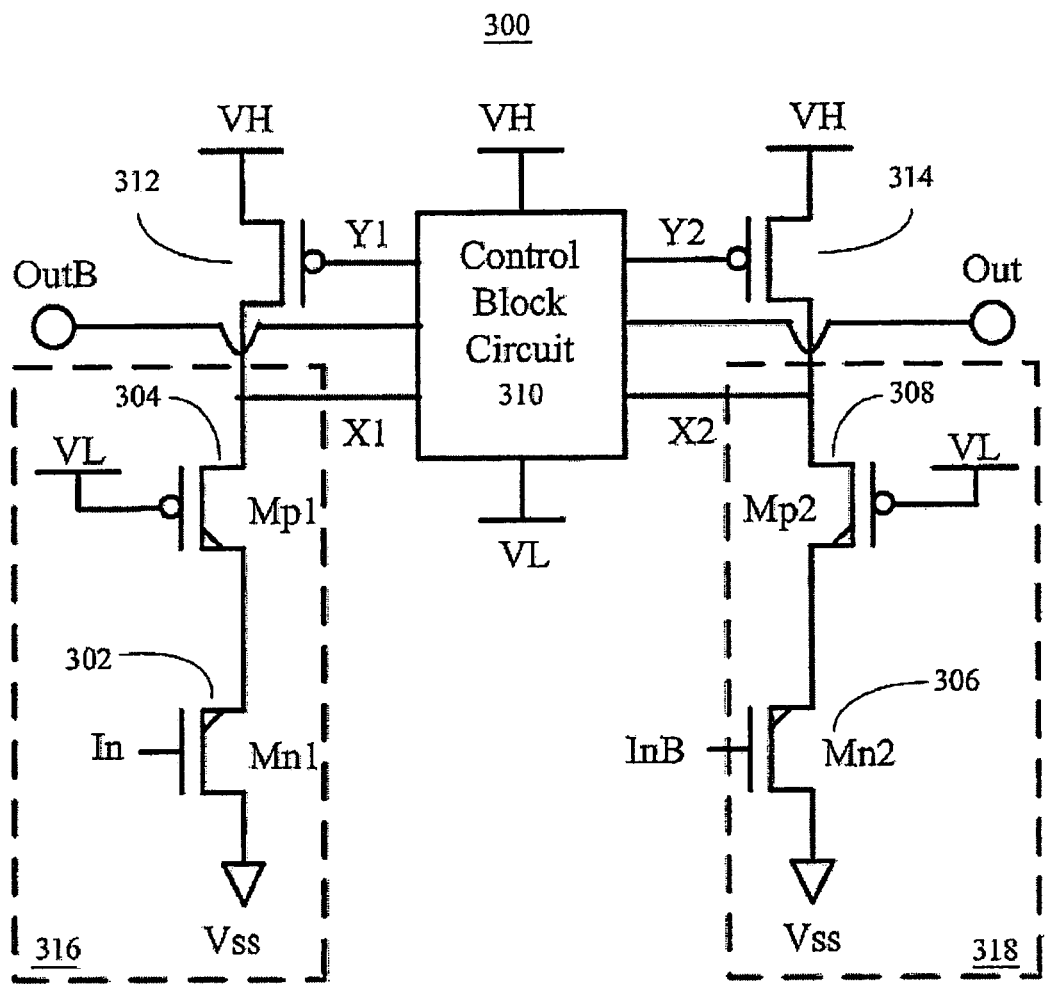
FIG. 3 is a circuit diagram of a level shift circuit according to a first embodiment of the present invention.

FIG. 3 is a circuit diagram of a level shift circuit 300 according to a first embodiment of the present invention. The level shift circuit 300 comprises a first voltage level transfer unit 316, a second voltage level transfer unit 318, a control block circuit 310, a first PMOS pull-up transistor 312 and a second PMOS pull-up transistor 314. The first voltage level transfer unit 316 further comprises a NMOS transistor 302 and a PMOS transistor 304, wherein the gate of NMOS transistor 302 receives a first input signal which is operated in first voltage level (Vdd and Vss), the source of the NMOS transistor 302 is coupled to the supply voltage Vss, and the drain and gate of PMOS transistor 304 are respectively coupled to the NMOS transistor 302 and supply voltage VL for outputting the level transferred control signal X1 (operated in VH and VL level). On the other hand, the second voltage level transfer unit 318 comprises NMOS transistor 306 and PMOS transistor 308, wherein the gate of NMOS transistor 306 receives a second input signal which operated in first voltage level (Vdd and Vss), the source of the NMOS transistor 306 is coupled to the supply voltage Vss, and the drain and gate of PMOS transistor 308 are respectively coupled to the NMOS 306 transistor and supply voltage VL for outputting the level transferred control signal X2 (operated in VH and VL level). It is noticed that the first input signal In and the second input signal InB are inversed signal. Furthermore, the process of first voltage level transfer unit 316 and second voltage level transfer unit 318 are implemented by high-voltage process.

The function of the level shift circuit 300 is to shift the voltage level of input signal In from first voltage level to second voltage level ((Vss and Vdd level) to (VL and VH level)). As shown in FIG. 3, when the NMOS transistor 302 receives the first input signal In, the PMOS transistor 304 generates a level transferred control signal X1 to the control block circuit 310. On the other hand, when the NMOS transistor 306 receives the second input signal InB, the PMOS transistor 308 also generates a level transferred control signal X2 to control block circuit 310. It is obvious that the voltage level of the two control signals X1 and X2 have been shifted to the second voltage level (VH and VL) for controlling a control block circuit 310, wherein the control block circuit 310 coupled between VH and VL. When the control block circuit 310 receives the first control signal X1 and the second control signal X2, an output signal Out will be generated. The level of the output signal Out is the voltage between VH and VL, and the logic value of the output signal Out corresponds to the first input signal In. Additionally, after the control block circuit 310 receives the first control signal X1 and the second control signal X2, two operation signals Y1 and Y2 will be generated, which is to adjust the voltage level of the first control signal X1 and the second control signal X2 through transistors 312 and 314, respectively.

Figure 4:
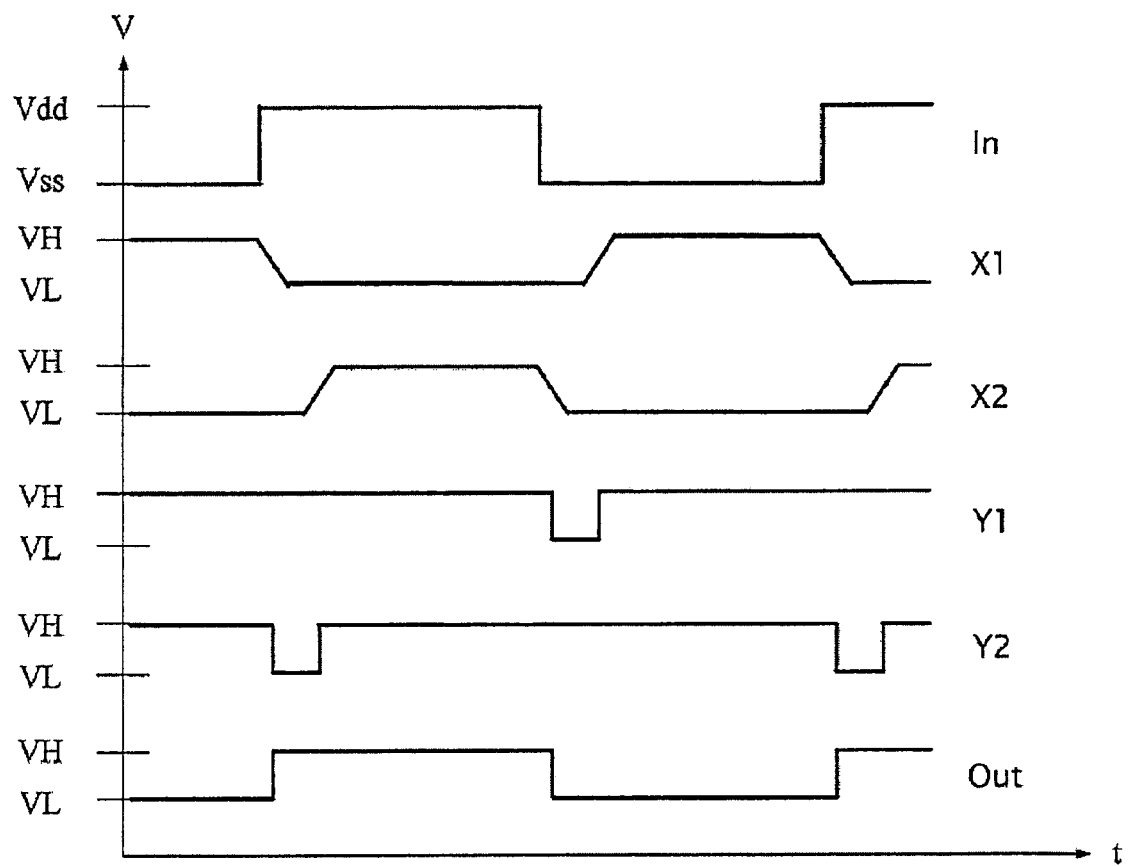
FIG. 4 is a timing diagram of all the signals in FIG. 3.

FIG. 4 is a diagram of all the signals in FIG. 3. As shown in FIG. 4, when the first input signal In changes from 0 (Vss) to 1 (Vdd), the first control signal X1 will be pulled down to 0 (VL). Since the control block circuit 310 detects the first control signal X1 pulled down, it will set Y2 to 0 (VL). At this time, the output signal Out will be set to 1 (VH) so as to make the output signal correspond to the first input signal with logic value (1). On the other hand, when Y2 is pulled down to 0 (VL), the PMOS pull-up transistor 314 will pull up the second control signal X2. At this time, due to Y1 is 1 (VH) and InB already becomes 0 (VL), only the parasitic capacitances of the transistors 302, 304, 306 and 308 are charged and discharged, hence having a very low power dissipation. When the second control signal X2 is charged to 1 (VH), the control block circuit 310 will pull up Y2 to 1 (VH) so as to stop the transistor 314 to pull up X2. On the contrary, when the first input signal In changes from 1 (Vdd) to 0 (Vss), the operations of the level shift circuit 300 are reversed to mentioned above, therefore the further detail description is omitted for brevity.

Figure 5:
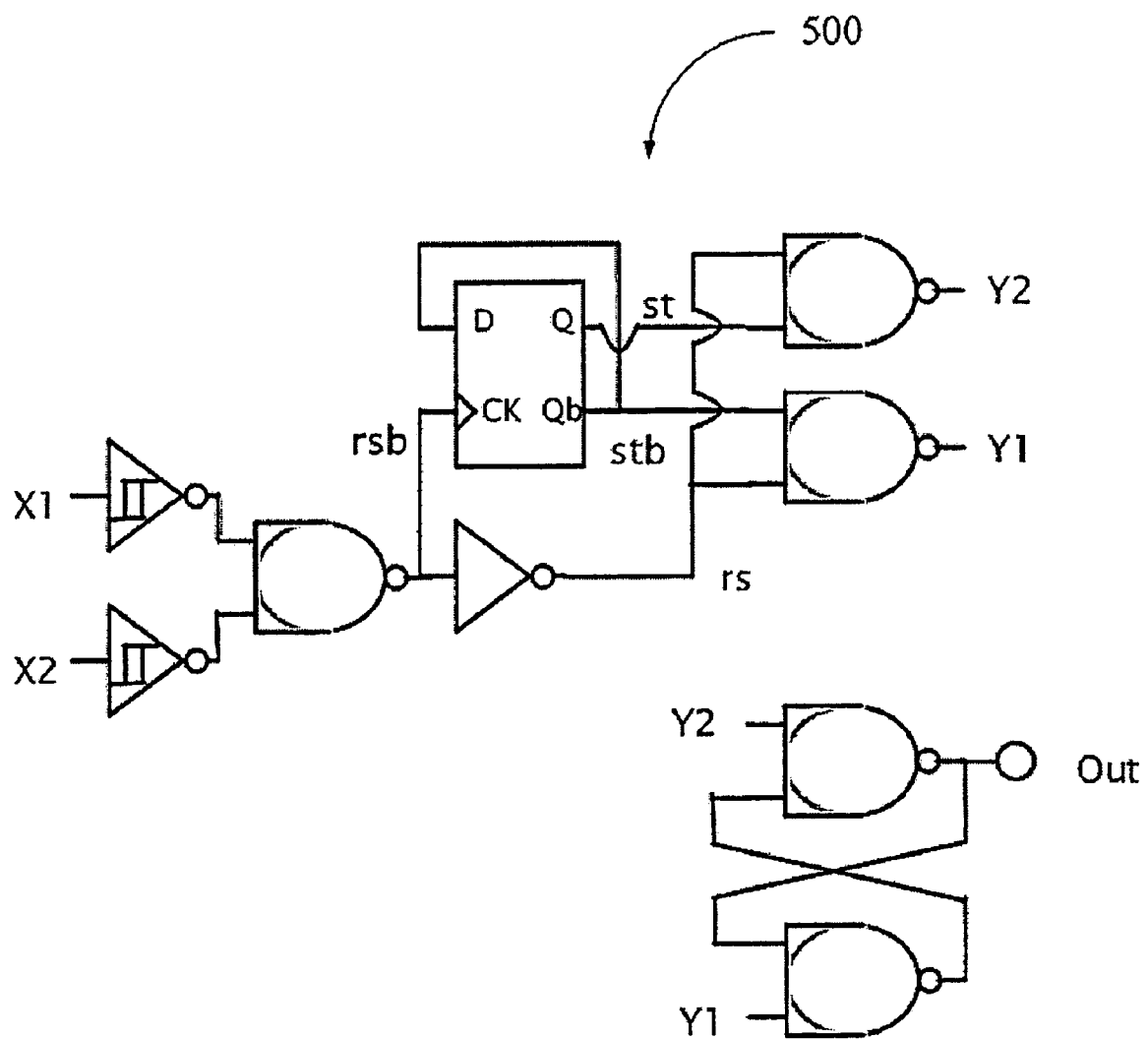
FIG. 5 is a circuit diagram of the control block circuit in FIG. 3 according to an embodiment of the present invention.

FIG. 5 is a circuit diagram of the control block circuit 500 in FIG. 3 according to an embodiment of the present invention. As shown in FIG. 5, when the first input signal In is 1 (Vdd), the signal st ought to be 1 (VH). When both the first control signal X1 and the second control signal X2 are 0 (VL), the signal rs is set to 1 (VH). One of st and stb is necessarily 1 (VH). If stb is 1 (VH), then Y1 is 0 (VL), and X1 is pulled up to 1 (VH). Subsequently, rst becomes 1 (VH) to set st to 1 (VH), and rs becomes 0 (VL). At this time, because In is 1 (Vdd), X1 will be pulled down to 0 (VL) again, and rs will be set to 1 (VH) again, and Y2 will be set to 0 (VL). After the second control signal X2 is set to 1 (VH), Y1 and Y2 will become 1 (VH) again, waiting for the next time of change of In. At this time, the circuit is in the proper state. This shows that the circuit itself can restore to the correct state.

Figure 6:
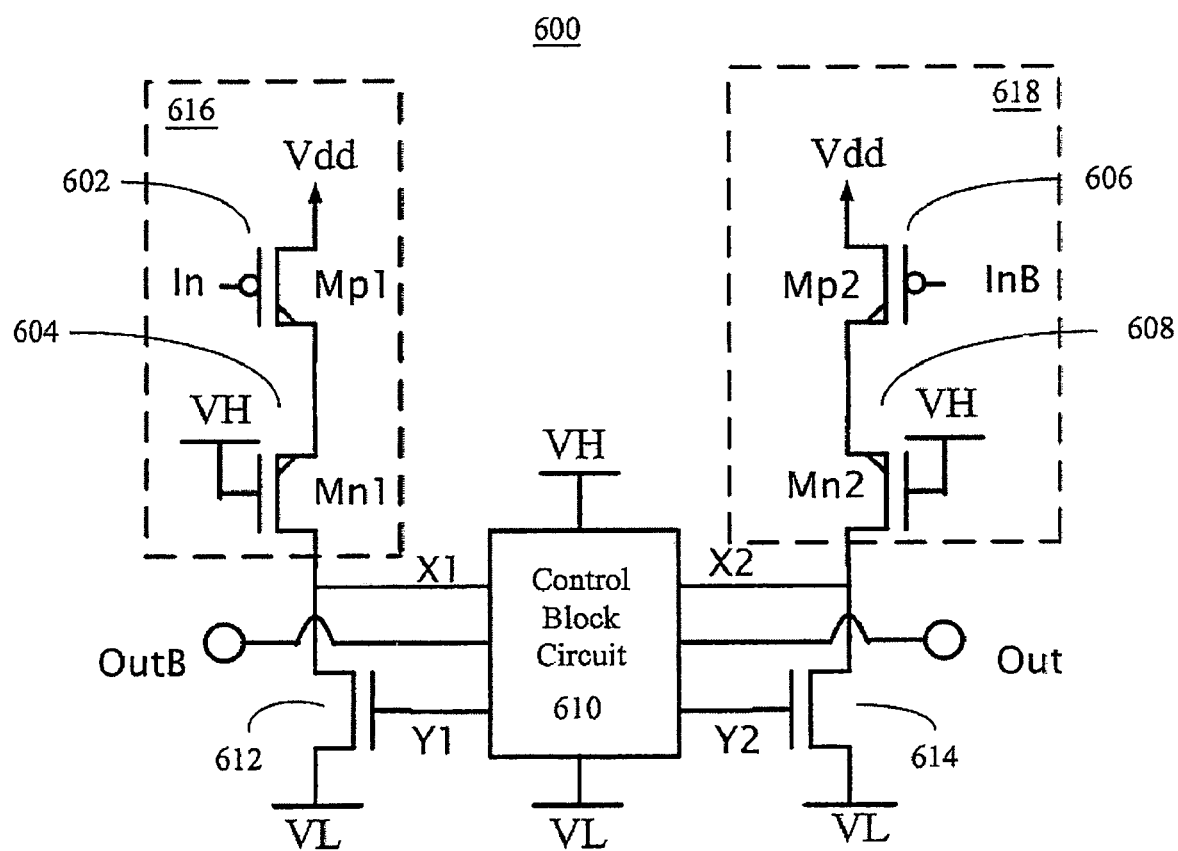
FIG. 6 is a circuit diagram of a level shift circuit according to a second embodiment of the present invention.

FIG. 6 is a circuit diagram of a level shift circuit 600 according to a second embodiment of the present invention. The level shift circuit 600 comprises a first voltage level transfer unit 616, a second voltage level transfer unit 618, a control block circuit 610, a first NMOS pull-down transistor 612 and a second NMOS pull-down transistor 614. The first voltage level transfer unit 616 further comprises PMOS transistor 602 and NMOS transistor 604, wherein the gate of PMOS transistor 602 receives a first input signal which is operated in first voltage level (Vdd and Vss), the source of the PMOS transistor 602 is coupled to the supply voltage Vdd, and the drain and gate of NMOS transistor 604 are respectively coupled to the PMOS transistor 602 and supply voltage VH for outputting the level transferred control signal X1 (operated in VH and VL level). On the other hand, the second voltage level transfer unit 618 comprises PMOS transistor 606 and NMOS transistor 608, wherein the gate of PMOS transistor 606 receives a second input signal which is operated in first voltage level (Vdd and Vss), the source of the PMOS transistor 606 is coupled to the supply voltage Vdd, and the drain and gate of NMOS transistor 608 are respectively coupled to the PMOS 606 transistor and supply voltage VH for outputting the level transferred control signal X2 (operated in VH and VL level). It is noticed that the first input signal In and the second input signal InB are inversed signal. Furthermore, the process of first voltage level transfer unit 616 and second voltage level transfer unit 618 is implemented by high-voltage process.

As the first embodiment, the function of the level shift circuit 600 is to shift the voltage level of input signal In from first voltage level to second voltage level ((Vss and Vdd level) to (VL and VH level)). As shown in FIG. 6, when the PMOS transistor 602 receives the first input signal In, the NMOS transistor 604 generates a level transferred control signal X1 to the control block circuit 610. On the other hand, when the PMOS transistor 606 receives the second input signal InB, the PMOS transistor 608 also generates a level transferred control signal X2 to control block circuit 610. It is obvious that the voltage level of the two control signals X1 and X2 have been shifted to the second voltage level (VH and VL) for controlling a control block circuit 310, wherein the control block circuit 610 is coupled between VH and VL. When the control block circuit 610 receives the first control signal X1 and the second control signal X2, an output signal Out will be generated. The level of the output signal Out is also between VH and VL, and the logic value of the output signal Out corresponds to the first input signal In. Additionally, after the control block circuit 610 receives the first control signal X1 and the second control signal X2, two operation signals Y1 and Y2 will be generated, which for adjusting the voltage level of the first control signal X1 and the second control signal X2 through transistors 612 and 614, respectively.

Figure 7:
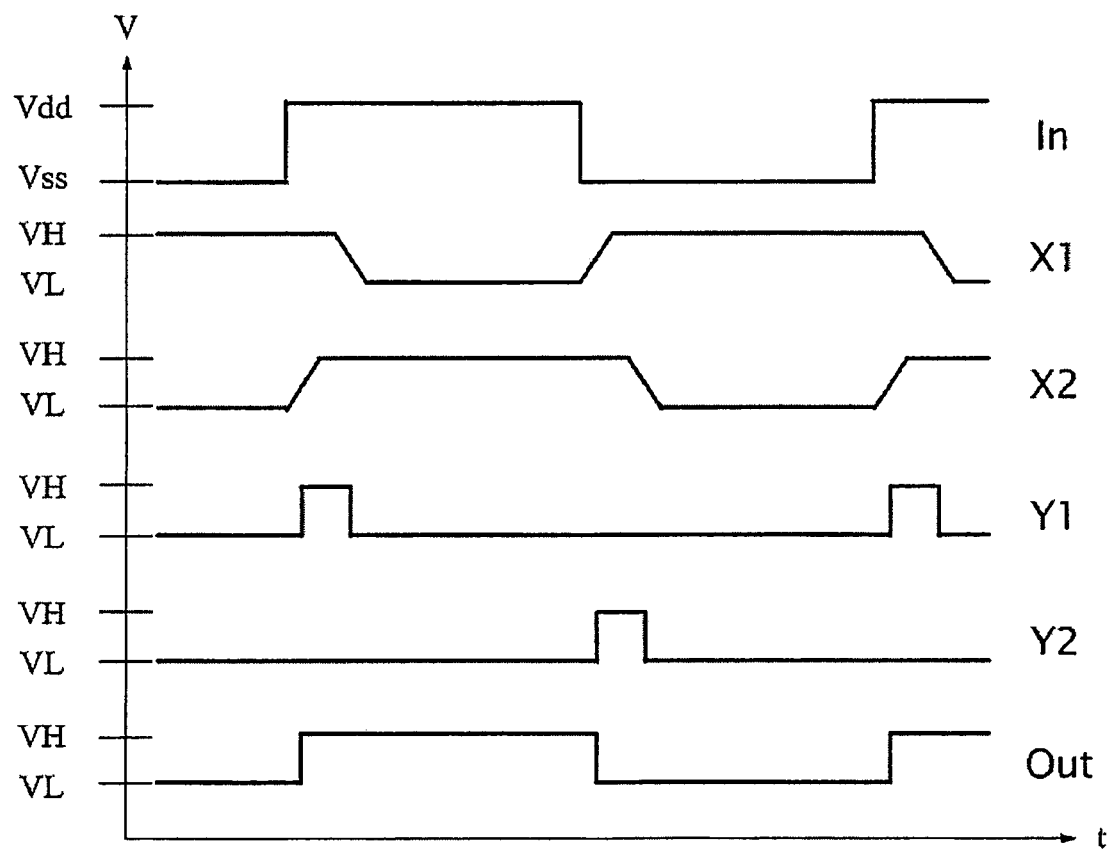
FIG. 7 is a timing diagram of all the signals in FIG. 6.

FIG. 7 is a timing diagram of all the signals in FIG. 6. As shown in FIG. 7, when the first input signal In changes from 1 (Vdd) to 0 (Vss), the first control signal X1 will be pulled up to 1 (VH) by NMOS transistor 604. Accordingly, after the control block circuit 610 detects that the first control signal X1 being pulled up, the control block circuit 610 will set Y2 to 1 (VH). At this time, the output signal Out will be set to 0 (VL) so as to make the output signal correspond to the first input signal with logic value (0). On the other hand, When Y2 is pulled up to 1 (VH), the NMOS pull-down transistor 614 will pull down the second control signal X2. At this time, due to Y1 is 0 (VL) and InB already becomes 1 (VH), only the parasitic capacitances of the transistors 602, 604, 606 and 608 are charged and discharged, hence having a very low power dissipation. When the second control signal X2 is discharged to 0 (VL), the control block circuit 610 will pull down Y2 to 0 (VL) so as to stop the transistor 614 to pull down X2. On the contrary, when the first input signal In changes from 0 (Vdd) to 1 (Vss), the operations of the level shift circuit 600 are reverse to mentioned above, therefore the further detail description is omitted for brevity.

Figure 8:
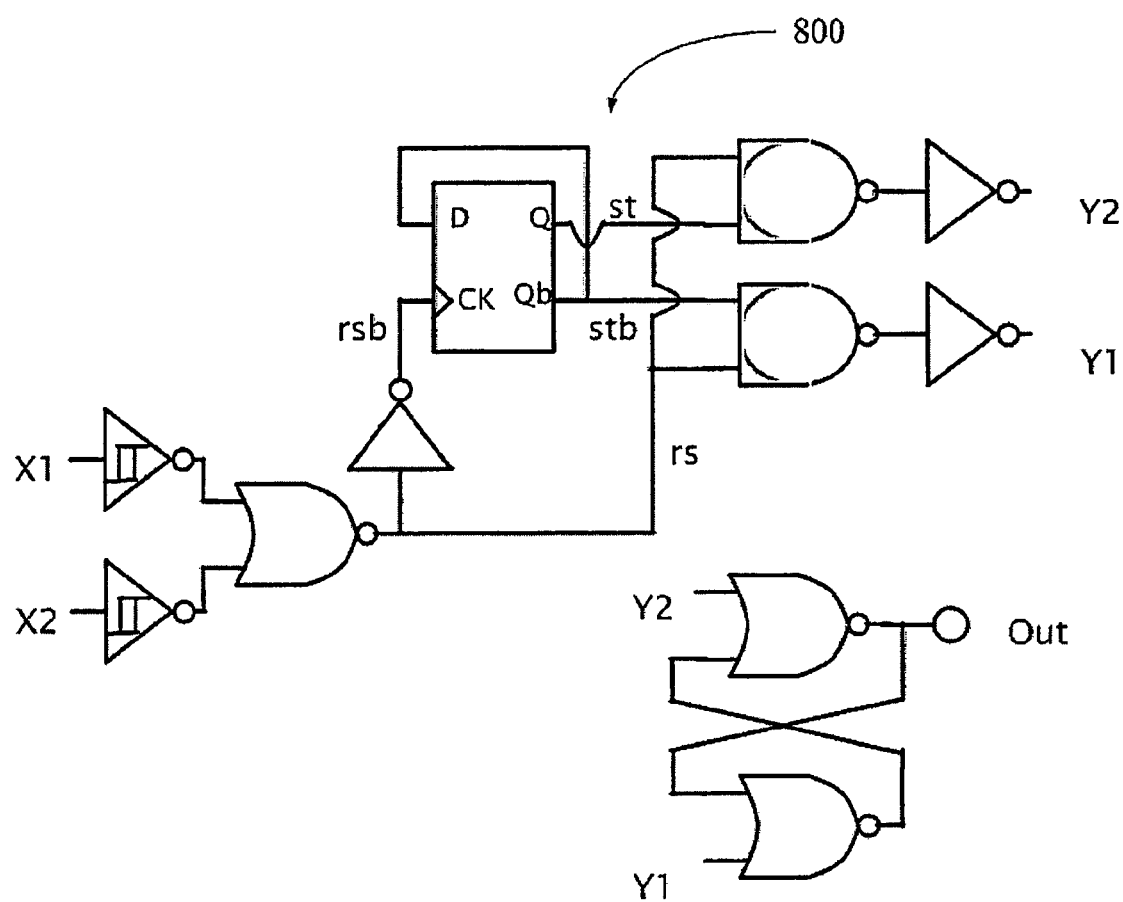
FIG. 8 is a circuit diagram of the control block circuit in FIG. 6 according to an embodiment of the present invention.

FIG. 8 is a circuit diagram of the control block circuit 800 in FIG. 6 according to an embodiment of the present invention. The control block circuit 800 can accomplish the functions of the signals in FIG. 7. Besides, when the signal is at the initial state or is erroneous, the circuit also has the function of restoring to the correct state by itself.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A level shift circuit, comprising:
   a first voltage level transfer unit, for transferring the voltage level of a first input signal from a first voltage level to a second voltage level and outputting a first level transferred control signal;
   a second voltage level transfer unit, for transferring the voltage level of a second input signal from the first voltage level to the second voltage level and outputting a second level transferred control signal; and
   a control block circuit coupled to the first voltage level transfer unit and the second voltage level transfer unit, for outputting an output signal according to the first level transferred control signal and the second level transferred control signal;
   wherein the first input signal and the second input signal are inversed; and the first voltage level transfer unit comprises:
a first NMOS transistor having a source, a drain and a gate, the source of the first NMOS transistor being coupled to the first supply voltage with first voltage level, the gate of the first NMOS transistor being used to receive the first input signal; and
a first PMOS transistor having a source, a drain and a gate, the drain of the first PMOS transistor being coupled to the drain of said first NMOS transistor, the gate of the first PMOS transistor being coupled to the second supply voltage with second voltage level, the source of the first PMOS transistor being used to output the first level transferred control signal and coupled to the control block circuit.

2. The level shift circuit as claimed in claim 1, wherein the second voltage level transfer unit comprises:
a second NMOS transistor having a source, a drain and a gate, the source of the second NMOS transistor being coupled to the first supply voltage with the first voltage level, the gate of the second NMOS transistor being used to receive the second input signal; and
a second PMOS transistor having a source, a drain and a gate, the drain of the second PMOS transistor being coupled to the drain of the second NMOS transistor, the gate of the second PMOS transistor being coupled to the second supply voltage with second voltage level, the source of the second PMOS transistor being used to output the second level transferred control signal and coupled to the control block circuit.

3. The level shift circuit as claimed in claim 2 further comprises:
a first PMOS pull-up component coupled to the control block circuit and the first voltage level transfer unit, for pulling-up the first level transferred control signal; and
a second PMOS pull-up component coupled to the control block circuit and the second voltage level transfer unit, for pulling-up the second level transferred control signal.

4. The level shift circuit as claimed in claim 1, wherein both the first voltage level transfer unit and the second voltage level transfer unit are implemented by a high-voltage process.

5. The level shift circuit as claimed in claim 1, wherein the first input signal and the second input signal are operated at the first voltage level, the first level transferred control signal, the second level transferred control signal and the output signal are operated at the second voltage level.

6. The level shift circuit as claimed in claim 1, wherein the level shift circuit is used to drive an audio device.

7. A level shift circuit, comprising:
a first voltage level transfer unit, for transferring the voltage level of a first input signal from a first voltage level to a second voltage level and outputting a first level transferred control signal;
a second voltage level transfer unit, for transferring the voltage level of a second input signal from the first voltage level to the second voltage level and outputting a second level transferred control signal; and
a control block circuit coupled to the first voltage level transfer unit and the second voltage level transfer unit, for outputting an output signal according to the first level transferred control signal and the second level transferred control signal;
wherein the first input signal and the second input signal are inversed; and
the first voltage level transfer unit comprises:
a first PMOS transistor having a source, a drain and a gate, the source of the first PMOS transistor being coupled to the first supply voltage with first voltage level, the gate of the first PMOS transistor being used to receive the first input signal; and
a first NMOS transistor having a source, a drain and a gate, the drain of the first NMOS transistor being coupled to the drain of said first PMOS transistor, the gate of the first NMOS transistor being coupled to the second supply voltage with second voltage level, the source of the first NMOS transistor being used to output the first level transferred control signal and coupled to the control block circuit.

8. The level shift circuit as claimed in claim 7, wherein the second voltage level transfer unit comprises:
a second PMOS transistor having a source, a drain and a gate, the source of the second PMOS transistor being coupled to the first supply voltage with the first voltage level, the gate of the second PMOS transistor being used to receive the second input signal; and
a second NMOS transistor having a source, a drain and a gate, the drain of the second NMOS transistor being coupled to the drain of the second PMOS transistor, the gate of the second NMOS transistor being coupled to the second supply voltage with second voltage level, the source of the second NMOS transistor being used to output the second level transferred control signal and coupled to the control block circuit.

9. The level shift circuit as claimed in claim 8 further comprises:
a first NMOS pull-down component coupled to the control block circuit and the first voltage level transfer unit, for pulling-down the first level transferred control signal; and
a second NMOS pull-down component coupled to the control block circuit and the second voltage level transfer unit, for pulling-down the second level transferred control signal.

10. The level shift circuit as claimed in claim 7, wherein both the first voltage level transfer unit and the second voltage level transfer unit are implemented by a high-voltage process.

11. The level shift circuit as claimed in claim 7, wherein the first input signal and the second input signal are operated at the first voltage level, the first level transferred control signal, the second level transferred control signal and the output signal are operated at the second voltage level.

12. The level shift circuit as claimed in claim 7, wherein the level shift circuit is used to drive an audio device.

13. A level shift circuit, comprising:
a first voltage level transfer unit, for transferring the voltage level of a first input signal from a first voltage level to a second voltage level and outputting a first level transferred control signal;
a second voltage level transfer unit, for transferring the voltage level of a second input signal from the first voltage level to the second voltage level and outputting a second level transferred control signal; and
a control block circuit coupled to the first voltage level transfer unit and the second voltage level transfer unit, for outputting an output signal according to the first level transferred control signal and the second level transferred control signal;
wherein the first voltage level transfer unit comprises:
a first transistor having a source, a drain and a gate, the source of the first transistor being coupled to the first supply voltage with first voltage level, the gate of the first transistor being used to receive the first input signal; and
a second transistor having a source, a drain and a gate, the drain of the second transistor being coupled to the drain of said first transistor, the gate of the second transistor being coupled to the second supply voltage with second voltage level, the source of the second transistor being used to output the first level transferred control signal and coupled to the control block circuit; and the second voltage level transfer unit comprises:

a third transistor having a source, a drain and a gate, the source of the third transistor being coupled to the first supply voltage with the first voltage level, the gate of the third transistor being used to receive the second input signal; and a fourth transistor having a source, a drain and a gate, the drain of the fourth transistor being coupled to the drain of the third transistor, the gate of the fourth transistor being coupled to the second supply voltage with second voltage level, the source of the fourth transistor being used to output the second level transferred control signal and coupled to the control block circuit.

14. The level shift circuit as claimed in claim 13, wherein the first and the third transistors are NMOS transistor, the second and the forth transistors are PMOS transistor.

15. The level shift circuit as claimed in claim 13, wherein the first and the third transistors are PMOS transistor, the second and the forth transistors are NMOS transistor.

16. The level shift circuit as claimed in claim 13 further comprises:

a first PMOS pull-up component coupled to the control block circuit and the first voltage level transfer unit, for pulling-up the first level transferred control signal; and a second PMOS pull-up component coupled to the control block circuit and the second voltage level transfer unit, for pulling-up the second level transferred control signal.

17. The level shift circuit as claimed in claim 13 further comprises:

a first NMOS pull-down component coupled to the control block circuit and the first voltage level transfer unit, for pulling-down the first level transferred control signal; and a second NMOS pull-down component coupled to the control block circuit and the second voltage level transfer unit, for pulling-down the second level transferred control signal.

18. The level shift circuit as claimed in claim 13, wherein the first input signal and the second input signal are operated at the first voltage level, the first level transferred control signal, the second level transferred control signal and the output signal are operated at the second voltage level.

* * * * *